(12) United States Patent
Stephens (10) Patent No.: US 7,204,864 B2
(45) Date of Patent: Apr. 17, 2007

(54) COMBUSTIBLE PRODUCT AND PACKAGE

(75) Inventor: Michael W. Stephens, Glen Allen, VA (US)

(73) Assignee: Stephens & Company, LLC, Glen Allen, VA (US)

( * ) Notice: Subject to any disclaimer, the term of this patent is extended or adjusted under 35 U.S.C. 154(b) by 0 days.

(21) Appl. No.: 10/766,219

(22) Filed: Jan. 28, 2004

(65) Prior Publication Data

US 2005/0160664 A1  Jul. 28, 2005

(51) Int. Cl.
*C10L 5/02* (2006.01)

(52) U.S. Cl. .................. 44/530; 44/532; 44/533; 44/534; 44/541

(58) Field of Classification Search ............. 44/530, 44/531, 532, 533, 534, 541, 590, 592, 606, 44/608
See application file for complete search history.

(56) References Cited

U.S. PATENT DOCUMENTS

| | | | |
|---|---|---|---|
| 73,922 A | 1/1868 | Philbrick | |
| 86,427 A | 2/1869 | Loft | |
| 149,436 A | 4/1874 | Bynon | |
| 181,033 A | 8/1876 | Brown | |
| 236,889 A | 1/1881 | Hammer et al. | |
| 242,741 A * | 6/1881 | Banks | 44/522 |
| 308,140 A | 11/1884 | Connelly | |
| 369,184 A | 8/1887 | Johanson | |
| 748,312 A | 12/1903 | Sachse | |
| 1,866,931 A | 7/1932 | Heffernan, Jr. | |
| 1,959,472 A | 5/1934 | Heffernan, Jr. et al. | |
| D94,923 S | 3/1935 | Palmer | |
| 2,212,157 A | 8/1940 | Farnholtz | |
| 2,770,854 A | 11/1956 | Miszeika | |
| 2,834,661 A | 5/1958 | Chaplin | |
| D186,320 S | 10/1959 | Mustin | |
| 2,933,378 A | 4/1960 | Mustin et al. | |
| 3,028,228 A | 4/1962 | Chaplin | |
| 3,377,147 A | 4/1968 | Remines | |
| 3,575,156 A | 4/1971 | Hosford | |
| D223,722 S | 5/1972 | Stehouwer | |

(Continued)

FOREIGN PATENT DOCUMENTS

DE   3932631   *   4/1990

(Continued)

OTHER PUBLICATIONS

Aldrich Chemical Catalog, Conical Funnels. 1996, pp. T312-T313.*

*Primary Examiner*—Cephia D. Toomer
(74) *Attorney, Agent, or Firm*—John H. Thomas, P.C.

(57) ABSTRACT

A combustible product of various shapes and compositions efficiently and conveniently supplies heat, such as for outdoor cooking. The product includes a hollow cone of combustible material defining a substantially cone-shaped exterior, a substantially cone-shaped interior space, a large opening in the base of the cone and a small opening in the top of the cone creating a flue to facilitate ignition of the product and to allow individual products to be stacked upon each other for larger heating requirements or for efficient storage before use. The product may be a single integral piece of combustible material, a plurality of combustible pieces secured to each other to form the cone shape, or a plurality of combustible pieces arranged into a cone shape through means of combustible packaging.

4 Claims, 9 Drawing Sheets

U.S. PATENT DOCUMENTS

| | | |
|---|---|---|
| 3,684,087 A | 8/1972 | Anderson |
| 3,883,317 A | 5/1975 | Neme |
| D248,162 S | 6/1978 | Cavanaugh |
| 4,099,916 A | 7/1978 | Gardner et al. |
| 4,243,393 A | 1/1981 | Christian |
| 4,426,002 A | 1/1984 | Rez |
| 4,460,377 A | 7/1984 | Kalil |
| 4,478,601 A | 10/1984 | Stephens |
| 4,627,854 A | 12/1986 | Pratt |
| 4,725,286 A | 2/1988 | Brame |
| 4,781,128 A | 11/1988 | Salner |
| 4,793,320 A * | 12/1988 | Bakic ................. 126/25 B |
| 4,832,703 A | 5/1989 | Campana et al. |
| 4,834,774 A | 5/1989 | Fay, III et al. |
| D304,574 S | 11/1989 | Fay, III |
| 4,906,254 A * | 3/1990 | Antosko ................. 44/520 |
| 4,953,533 A | 9/1990 | Witt |
| 4,981,496 A | 1/1991 | Hausslein |
| D330,362 S | 10/1992 | Harris |
| 5,197,455 A | 3/1993 | Tessien |
| 5,273,555 A | 12/1993 | DeCarlo |
| 5,293,859 A | 3/1994 | Lisker |
| 5,711,766 A | 1/1998 | Bain |
| 5,743,248 A | 4/1998 | Jansen, Jr. |
| 6,027,539 A | 2/2000 | Toy |
| 6,379,405 B1 | 4/2002 | Reiger et al. |
| 6,440,362 B1 | 8/2002 | Bryant et al. |
| 6,790,244 B2 | 9/2004 | Saunders et al. |

FOREIGN PATENT DOCUMENTS

| | | |
|---|---|---|
| GB | 2091290 A | 1/1982 |
| GB | 2150594 A | 7/1985 |
| WO | WO03080770 | * 10/2003 |

* cited by examiner

COMBUSTIBLE PRODUCT AND PACKAGE

FIELD

Convenient combustible products and packages are designed for efficient burning and are able to be nested for storage and/or burning. In one example, a hollow cone of charcoal is adapted to be a complete, pre-manufactured package burned in a barbecue grill as fuel.

BACKGROUND

Outdoor cooking is an immensely popular activity enjoyed by many people. The burning of combustible fuel pieces from coal to charcoal to wood chips is well known. Common applications include burning charcoal in a backyard barbeque and burning coal lumps in a fire place.

Commonly, the actual combustible material is sold and stored in bulk containers. For instance, a 10 or 20 lb bag of charcoal can be kept in a consumer's garage next to their grill. Chunks of coal or wood may also be shipped in heavy bag containers. In each case, a consumer dispenses a portion of the pieces of combustible material to be burned. For instance, the consumer may pour briquettes from a charcoal bag into a grill then arrange them into a solid pyramid.

There are at least several problems with the foregoing state of the art of handling combustible materials. First, methods of the status quo typically require a consumer to handle a bulk of material such as a large bag of charcoal or coal. These bags may be heavy and dirty. And second, the combustion of these materials is not very efficient. The classic "pile" of charcoal briquettes in a grill burns slowly and inefficiently. This arrangement of charcoal typically requires some accelerant either applied onto or soaked into the briquette mixture. Also, airflow must be handled in order to achieve a quick and even burn. One mechanical solution that is available is a metal chimney that holds the charcoal briquettes that, once burning, are subsequently dumped into a grill.

SUMMARY

Accordingly, it is an object of the present invention to provide a convenient package and/or assembly that is designed to be ready to use and convenient to use for a consumer. Further, the package and/or assembly may facilitate the efficient air flow through the fuel to enhance the burning process.

In one example, a combustible product comprises a hollow cone of combustible material defining a substantially cone-shaped exterior and having a substantially cone-shaped interior space. The cone defines a large opening in the base of the cone and a small opening in the top of the cone. The cone is a single, integral piece of combustible material.

In another example, a combustible product comprises a hollow cone of combustible material, the hollow cone defining a substantially cone-shaped exterior and having a substantially cone-shaped interior space, the cone further defining a large opening in the base of the cone and small opening in the top of the cone. The cone comprises a plurality of combustible briquettes secured to each other to form the cone shape.

In a still further example, a combustible package comprises a hollow, cone-shaped combustible package defining a large opening in the base of the package and a small opening in the top of the package. The package defines a substantially cone-shaped exterior and has a substantially cone-shaped interior space. The package is adapted to contain combustible material and includes combustible material placed inside the package. The cross-sectional width of the package with combustible material inside has an outside width at the top of the package less than the width of the large opening at the base of the package.

DETAILED DESCRIPTION

The present invention is directed to a product and package of combustible material that is easily stored and handled for use with cooking and heating. The hollow cone shape has a predetermined size, and it is combinable/nestable with other cones. The geometry of the cone itself is engineered for an efficient and effective burn of the combustible material.

Three examples of the combustible cone will be described herein. Of course, other hybrids and combinations of features of combustible products and packaging will be evident to those of skill in the art given the teachings herein. An important feature of each product and package is the hollow structure that improves the handling and storage. Another feature includes the openings at the top and bottom of the cone that form a nature flue for improved burning efficiency.

In general terms, the product simplifies and improves the preparation of fuel for burning in several ways. The product can be pre-measured in common units that are self-contained, thereby requiring no dispensing from a bulk container. The product is pre-shaped and does not require manual arrangement or the use of additional tools or accelerants to facilitate heating. The conical shape of the product allows for stacking of the pre-measured units for variable heating requirements. The hollow shape of the product and package and the optional bottom apertures create a natural flue enhancing the rate of heating and burning as compared to solid cylindrical or pyramidal shapes. The resulting, enhanced rate of burning lessens the need for accelerants which may pose safety, environmental or health risks and may adversely affect the flavor of the cooked food. In various examples described herein, accelerant may be applied to the bottom only of the product or package that would then allow the natural flue action to promote burning of upper portions of the cone. Alternatively, a combustible packaging material could replace the need for a separate accelerant altogether.

Figure 1:
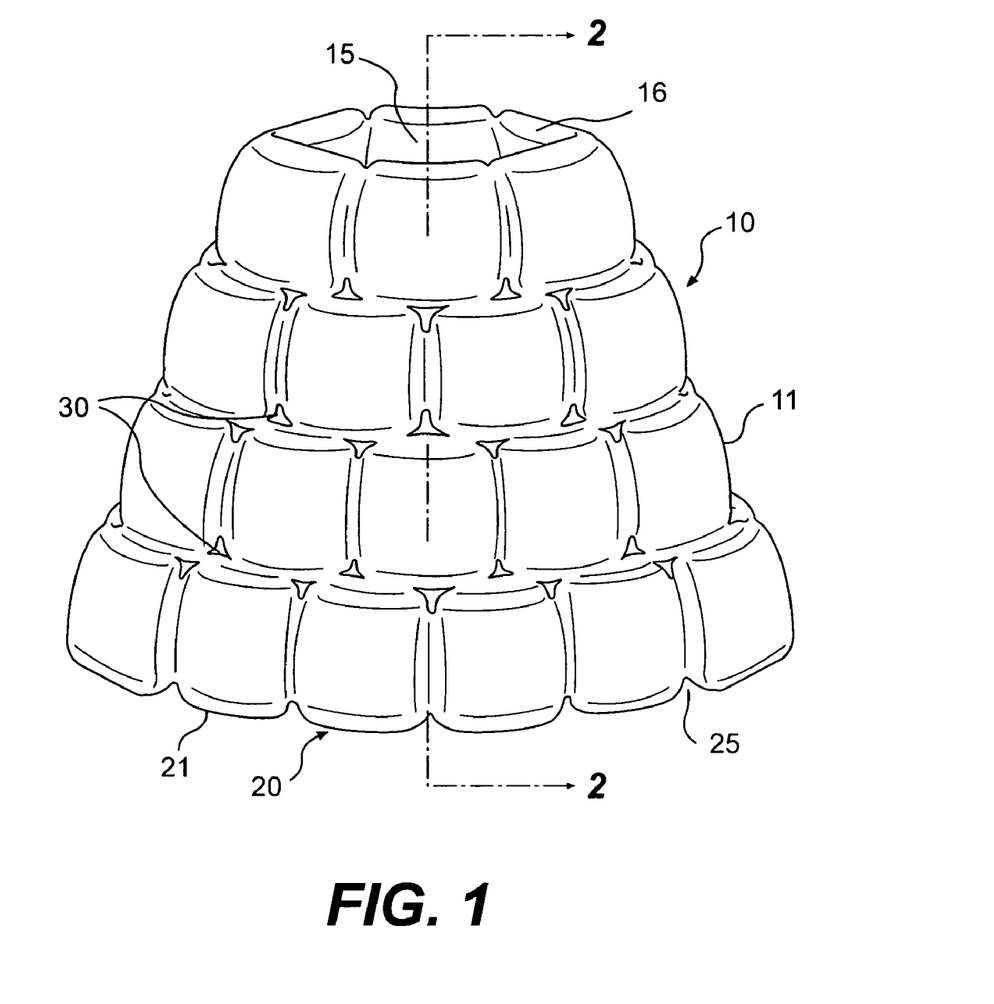
FIG. 1 is perspective view of an exemplary construction of a cone of combustible material.
Figure 2:
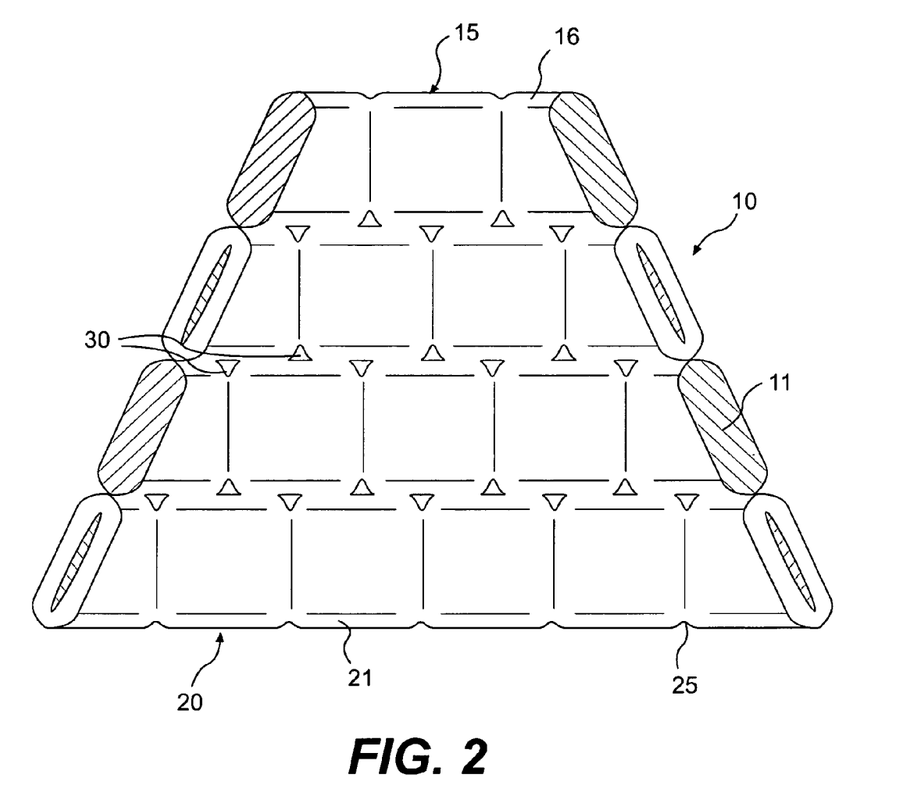
FIG. 2 is a side elevation, cross sectional view of FIG. 1 taken along lines 2—2 of FIG. 1.
Figure 3:
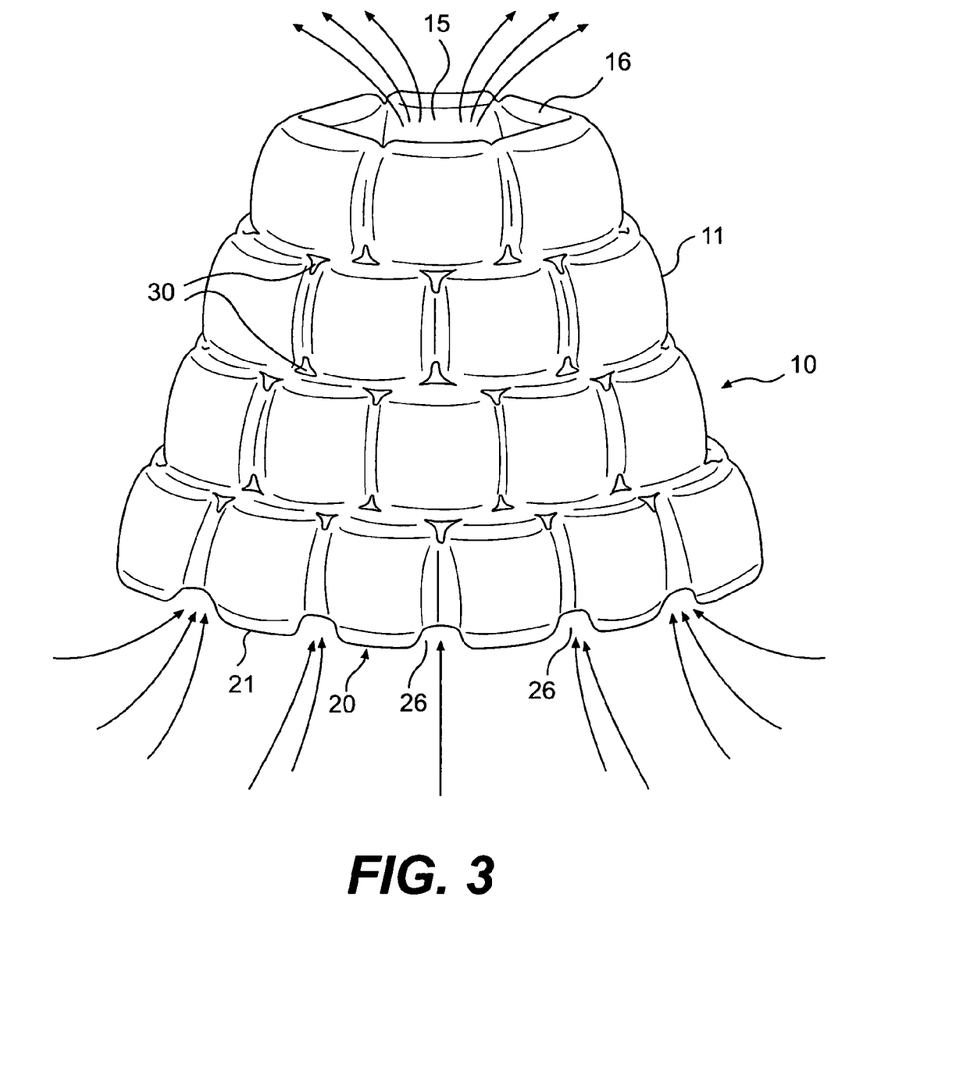
FIG. 3 is a perspective view of another example of a cone of combustible material.

FIGS. 1–3 illustrate an example of a pre-manufactured combustible product. Combustible product 10 is a cone of combustible material 11. The cone 10 is a hollow cone shape having a top opening 15 defined by the top edge 16 of combustible material. There is further a bottom opening 20 defined by the bottom edge 21 around the base of the cone 10. The cone 10 further includes apertures 30 in the side walls of the cone. These apertures provide for improved ventilation of the combustible material 11 when it is ignited. Also, the bottom edge 21 around the base of the cone 10 defines vents 25 that further enhance air flow through the hollow cone.

The air flow through the cone 10 is shown through the use of arrows in FIG. 3. As the cone 10 ignites, heat will rise and draw air through the vents 26 and out through the top aperture 15. In FIG. 3, the vents 26 are functionally identical to the vents 25 shown in FIGS. 1 and 2. Vents 26 (FIG. 3) are merely slightly larger than vents 25 (FIG. 1) to allow greater air flow.

Figure 4:
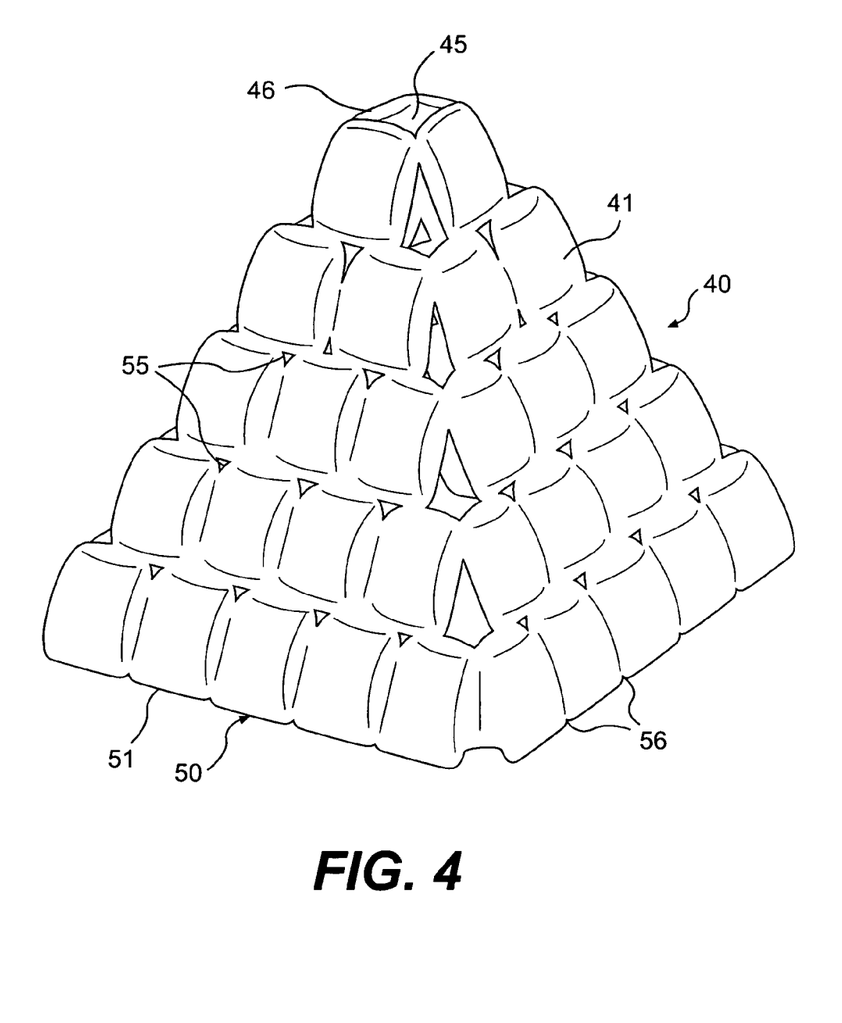
FIG. 4 is a perspective view of a pyramidal cone of combustible material.

In FIGS. 1–3, the cone 10 has a circular shape in that the base 21 of the cone substantially forms a circle. Alternatively, in FIG. 4, there is shown a cone 40 having a pyramidal shape in which the base 51 of the cone has four substantially straight walls that generally form a square. In FIG. 4, the cone 40 has combustible material 41 that define the walls of the cone. The hollow cone further has a top opening 45 defined by the top edge 46 of the cone and bottom opening 50 that is defined by the bottom edge 51 of the cone. There are apertures 55 in the sidewalls as well as vents 56 along the base/bottom edge 51 of the cone 40.

The present invention is not limited by the geometry of the particular cone shape shown in the figures. Only a circular cone and four-sided pyramidal cone are illustrated. Other geometries may alternatively be used including a three sided pyramid, and a base having a five-sides, six-sides, or other geometries, including asymmetric geometries. The structure also includes dome or bullet shapes. The term "cone" or "cone-shaped" refers to all of these alternative geometric structures. Also, the cone-shaped exterior of the product or package is not necessarily the same geometric cone shape of the interior space. In other words, the walls of combustible material that define the exterior and the interior space of the product or package may have varying thicknesses. The only limitation of the various conical-shapes is that they are able to be stacked or nested on one another, to at least some degree, to allow for efficient storage and use.

As demonstrated in FIG. 2, the material 11 forms the side walls of the cone 10 having varied thicknesses. This variability in the thickness of mass of the wall of the cone 10 provides for structural stability as well as improved and extended burning in which the relatively less massive sections burn through more quickly after igniting leaving the relatively more massive portions to burn more slowly, thereby providing a sustained heat source for cooking or heating. The walls may also be made thicker or more massive toward the top or bottom of the cone. In one prototype embodiment, the cone 10 will have a weight of about 2.5 lbs. It is believed that cones having a weight of from about one pound to about five pounds may be convenient.

The 2.5 pound cone is approximately equal to 40 charcoal briquettes—a common amount of charcoal used for outdoor grilling.

Manufacturing methods to form the combustible cone 10 include producing a solid wall of approximately 1.5 inches nominal width, which is shaped into the hollow cone. The solid wall can be formed with a series of grooves or apertures arranged such that their placement may create wall sections significantly thinner between larger sections of a nominal wall. Another manufacturing method could involve forming a combustible material into layered, circular rings of charcoal briquettes. The briquettes may be of relatively equal size and uniform shape, with each secured or otherwise connected to every adjacent briquette by a rib of sufficient size and thickness to allow air to pass between the briquettes and to provide structural stability until the briquettes are sufficiently heated. As seen in FIGS. 1–3, the combustible material 11 has a briquette-shaped contour and texture.

The combustible material 11 may include one or more or mixtures of different combustible materials including charcoal, coal, wood, sawdust, wax or other known combustible materials for cooking and heating. Particularly in the example of a combustion cone used in connection with grilling, there may be a desirable combination of charcoal and wood products to obtain a desired taste. Also, a cone may have different layers or segments of different combustible material. For instance, the lower portion of a cone may be an easily combustible material such as a sawdust/wax mixture, while the upper portion of a cone may be charcoal or coal. Still further, accelerant may be applied to all or a portion of the cone to aid in initiating combustion of the cone.

Figure 5:
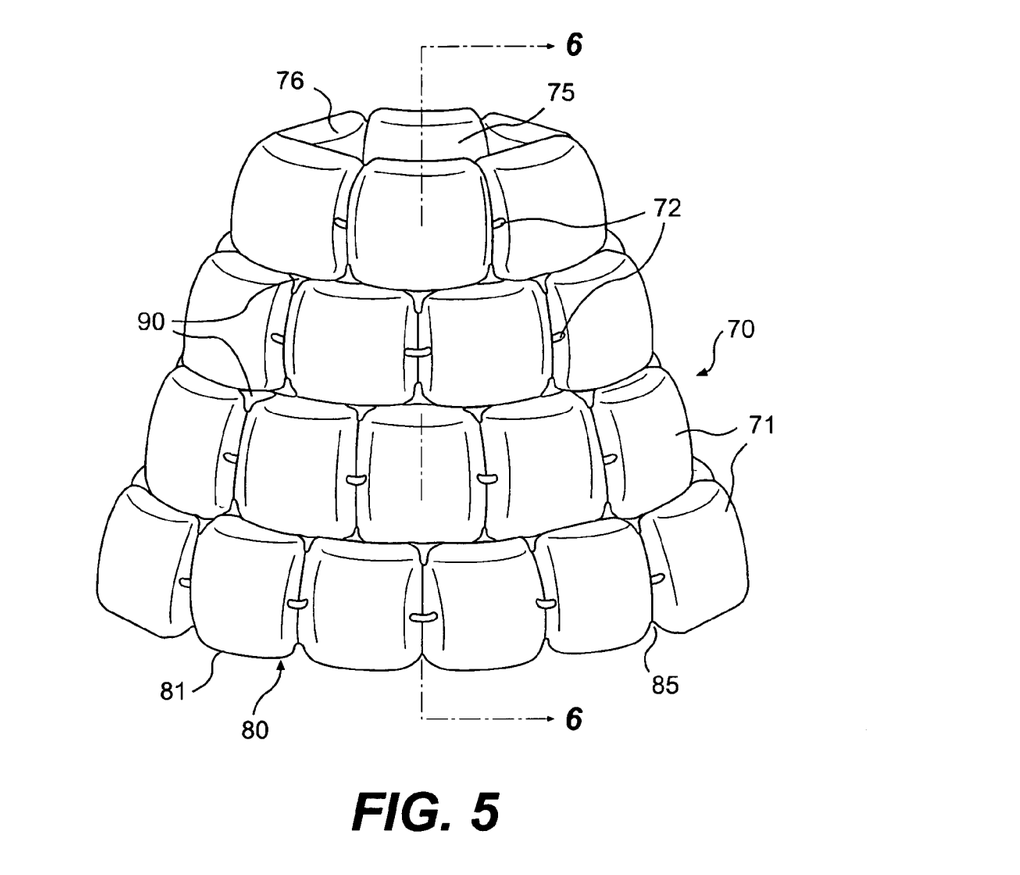
FIG. 5 is a perspective view of a pre-assembled cone of combustible material.
Figure 6:
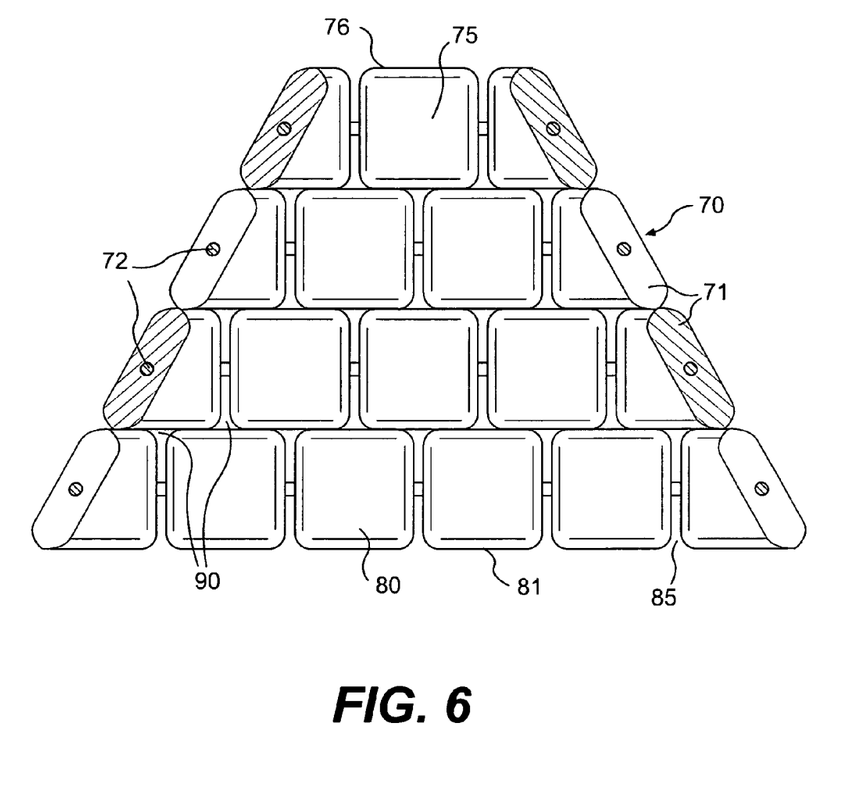
FIG. 6 is a side elevation, cross sectional view of the cone shown in FIG. 5 taken along lines 6—6 of FIG. 5.

FIGS. 5 and 6 illustrate an alternative example of a cone 70. The cone 70 is an assembly of combustible briquettes 71. The cone 70 is made up of layers (rings) of combustible briquettes 71 that form the cone-shape. This cone 70 is different from the previously-described cones 10 and 40 in that cone 70 is made up of individual pieces of combustible material 71. The cone 70 includes a top opening 75 defined by the top edge 76 of the cone. The cone 70 further includes a bottom opening 80 that is defined by the bottom edge 81 or base of the cone 70. The base 81 further defines vents 85 along the bottom of the cone 70. The assembly of individual combustible pieces 71 further defines side wall apertures 90 that improve air flow through the cone 70. As shown in FIGS. 5 and 6, the individual combustible pieces 71 are secured to adjacent pieces through a rigid or non-rigid material including, for instance, string, fiber or metal wire 72. Alternatively, the combustible pieces 71 may be formed in pre-connected rings or layers (four shown in FIGS. 5 and 6) that may be stacked on one another to form a cone shape. The size of cone may be varied by selecting the number of rows (rings) of combustible pieces.

Still further alternatively, an assembled product may include securing the pieces 71 to adjacent pieces through use of adhesives. Preferably, the adhesive is comprised of a composition designed to itself burn without emitting toxic fumes. For instance, a paste of charcoal, wax, sawdust and wood may be used in one embodiment. The other binding materials such as metal wire, string or fiber may be rigid or non-rigid. They may be threaded through the combustible briquettes 71 as shown.

The specific shape of the cone 70 and composition of the combustible material 71 are variable as described earlier herein.

Figure 7:
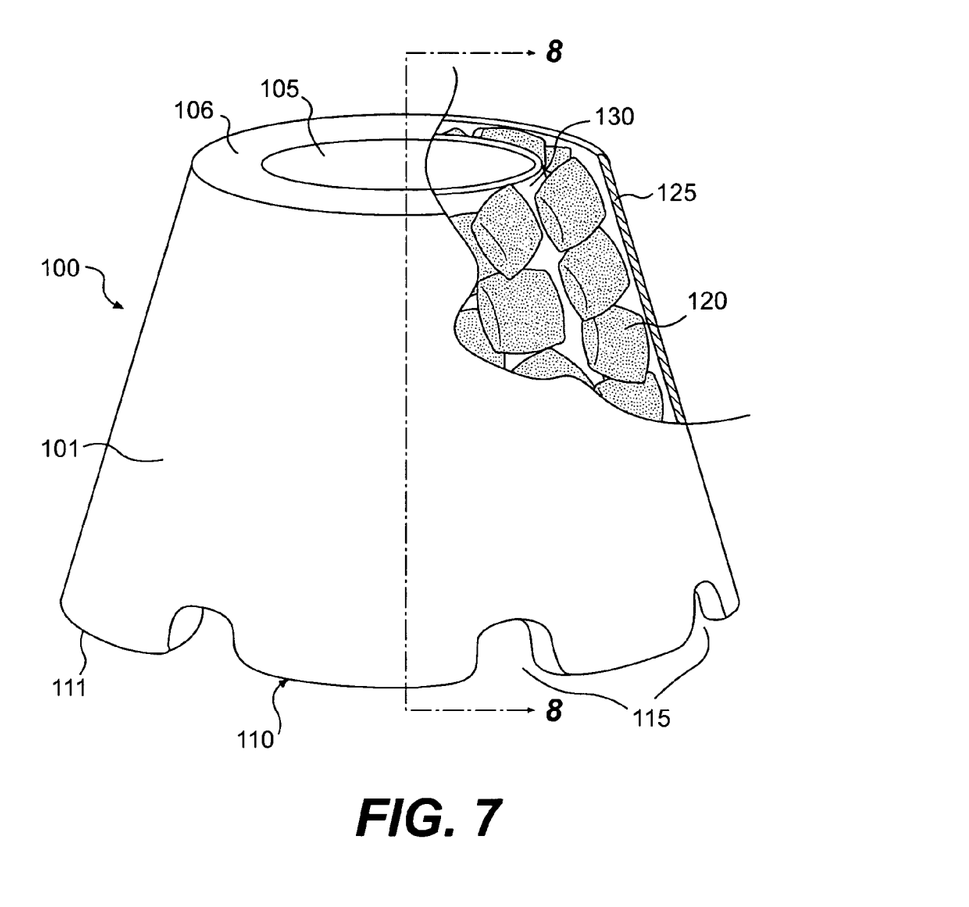
FIG. 7 is a perspective view of an example of a packaged cone of combustible material.
Figure 8:
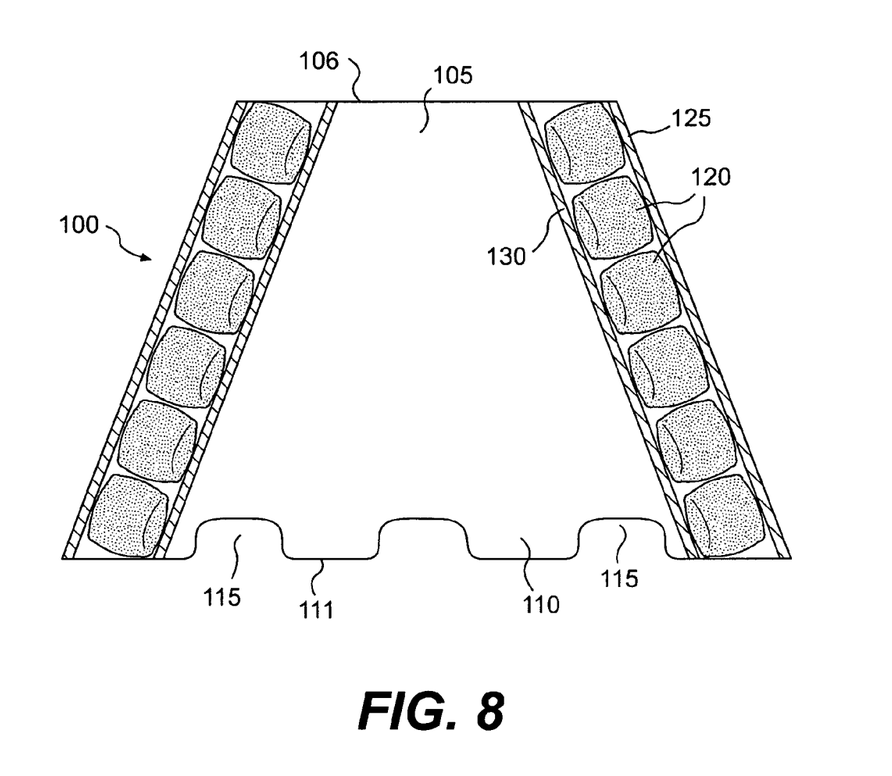
FIG. 8 is a side elevation, cross sectional view of the cone shown in FIG. 7 taken along lines 8—8 of FIG. 7.

FIGS. 7 and 8 illustrate a still further alternative of a combustible cone 100. The combustible cone 100 is a packaged embodiment wherein the package 101 contains combustible material in the form of briquettes 120. The cone 100 includes an outer wall 125 and an inner wall 130 that define the conical shape of the outside of the cone as well as the inside space. The cone 100 includes a top opening 105 defined by the top edge 106 of the cone. The cone 100 further includes a bottom opening 110 defined by the bottom edge or base 111 of the cone 100. The base 111 further defines vents 115 along the bottom edge of the cone 100. As seen best in FIG. 8, the combustible material 120 is made up of combustible briquettes. In one example, those briquettes are charcoal briquettes. As noted earlier herein, the combustible material 120 may further include other materials such as coal, wood, etc.

The inside wall 130 and the outside wall 125 of the cone 100 are fabricated, in one example, of a rigid material such as cardboard. This rigidity maintains the structural integrity of the cone 100. Alternatively, the inside wall 130 or the outside wall 125 only may be fabricated of a rigid material. The inside wall 130 and/or the outside wall 125 of the cone 100 are, in one example, a much less rigid paper packaging material. This flexible material must securely retain the combustible briquettes 120 within the cone package 100. The top edge 106 and bottom edge 111 may also be made of paper or cardboard or they may merely be extensions of the inside or outside walls 125 or 130. The outside packaging material 125 may be used for printing and graphics for marketing and consumer purchase and use information. Preferably, all of the packaging material, both the inside wall 130 and outside wall 125 are made from a combustible material. Still further alternatively, the packaging material may be of a specific composition selected to enhance the flavor of foods cooked using the burning combustible material. The specific construction of the inside wall 130 and outside wall 125 of the cone 100 may vary depending on the size of the cone being packaged as well as on other requirements, marketing or otherwise of the cone. Also, the package 100 may alternatively include a handle attached to the cone package 100. Preferably, the handle is made of a combustible material such as paper or cardboard.

The specific shape of the cone 100 and composition of the combustible material 120 are variable as described earlier herein.

Figure 9:
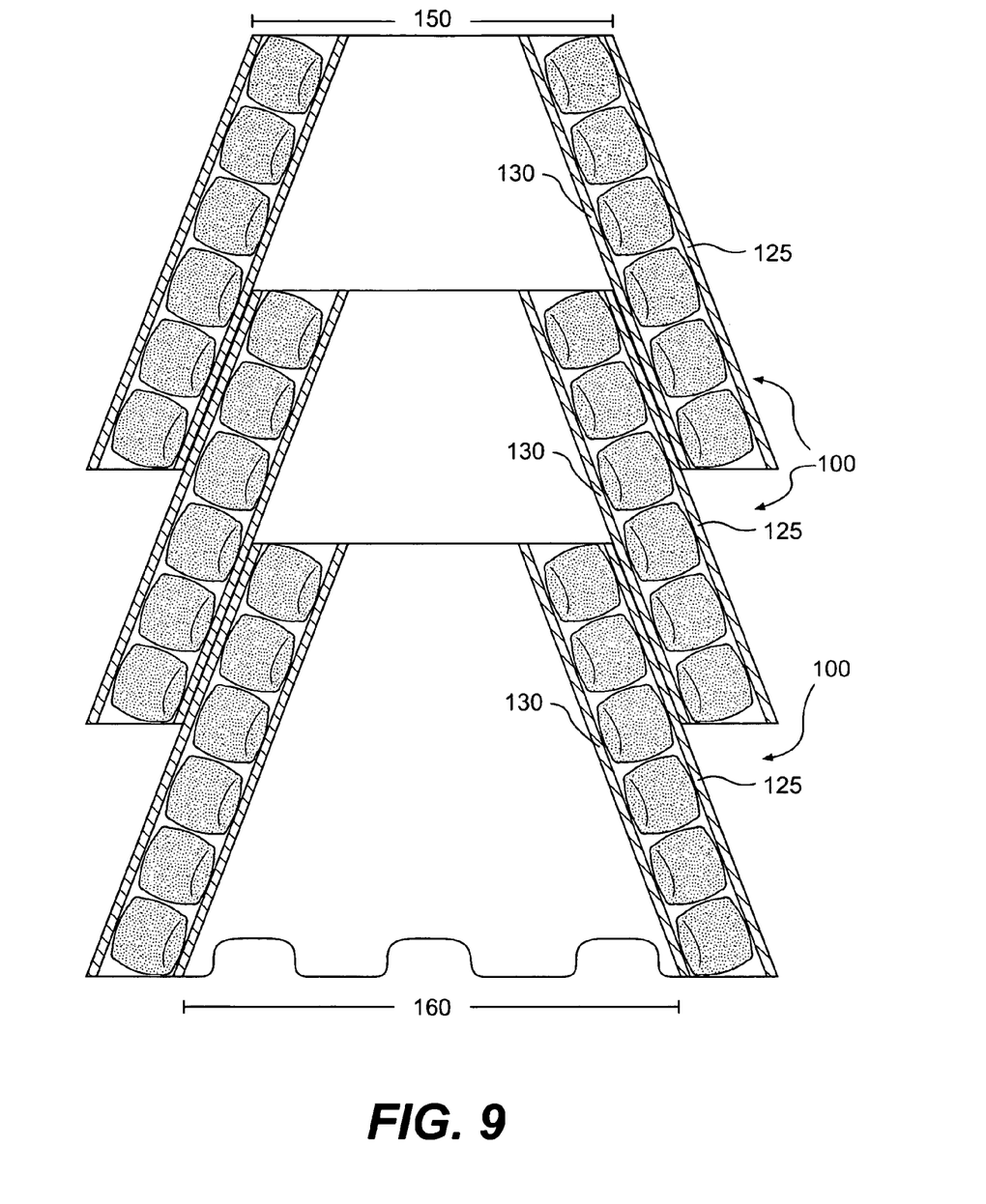
FIG. 9 is a side elevation, cross sectional view of a stack of three of the cones shown in FIGS. 7 and 8.

FIG. 9 is an embodiment illustrating the "stackable" geometry of the cones described herein. The cones 100 illustrated are the same as the cones shown in FIG. 8 of a packaged assembly. FIG. 9 may equally represent the pre-manufactured and/or pre-assembled embodiments or any other embodiments of cone-shaped combustible material. In each case, the outside width 150 of the top of the cone is shown as having a length less than the length of the inside width 160 of the base of the cone shaped interior space within the cone. In this way, as shown, the cones 100 may nest with each other. With this nesting feature, a user may determine that they desire a larger fire than simply one combustible cone. A user may then choose to use two or more combustible cones together by stacking. As shown in FIG. 9, there remains the flue effect of the central openings and hollow cone shape. Also, from a manufacturing and sales standpoint, the nesting feature makes the display and storage or combustible cones more efficient.

Also, as shown, the cones 100 nest into each other at about fifty percent of their height. Other geometries of the outside wall 125 and inside wall 130 may allow for varying degrees of "nestability". In other words, the cone shape may be flatter (relatively more broad base) or more pointed (relatively more narrow base). The walls may be relatively thicker in cross section or relatively thinner. The exterior of a cone may be generally circular and the interior space may be generally pyramidal. The bottom line is that there are numerous geometries in the shape of the cone that will allow nesting.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A nestable combustible package comprising:
    a hollow cone-shaped, combustible package defining an opening in the base of the package and an opening in the top of the package, wherein the opening in the base of the package is relatively larger than the opening in the top of the package;
    the package having a substantially cone-shaped exterior surface and having a substantially cone-shaped interior surface parallel with said exterior surface and defining a space therebetween;
    loose combustible material filling the space between the exterior and interior surfaces of the package, wherein the combustible material is selected from the group consisting of charcoal and coal;
    and wherein in a cross sectional width of the package with combustible material inside, the outside width of the top of the cone is less than the width of the opening in the base of the package, permitting the package to be nested with another, identical package with the outside of the top of the cone of one package being inserted into the opening of the base of a second package.

2. A nestable combustible package comprising:
    a hollow cone-shaped, combustible package defining an opening in the base of the package and an opening in the top of the package, wherein the opening in the base of the package is relatively larger than the opening in the top of the package;
    the package having a substantially cone-shaped exterior surface and having a substantially cone-shaped interior surface parallel with said exterior surface and defining a space therebetween;
    loose combustible material filling the space between the exterior and interior surfaces of the package;
    wherein the package further comprises cardboard forming the cone-shaped exterior and interior surfaces; and
    wherein in a cross sectional width of the package with combustible material inside, the outside width of the top of the cone is less than the width of the opening in the base of the package, permitting the package to be nested with another, identical package with the outside of the top of the cone of one package being inserted into the opening of the base of a second package.

3. A nestable combustible package comprising:
    a hollow cone-shaped, combustible package defining an opening in the base of the package and an opening in the top of the package, wherein the opening in the base of the package is relatively larger than the opening in the top of the package;
    the package having a substantially cone-shaped exterior surface and having a substantially cone-shaped interior surface parallel with said exterior surface and defining a space therebetween;
    charcoal briquets filling the space between the exterior and interior surfaces of the package; and
    wherein in a cross sectional width of the package with the charcoal briquets inside, the outside width of the top of the cone is less than the width of the opening in the base of the package, permitting the package to be nested with another, identical package with the outside of the top of the cone of one package being inserted into the opening of the base of a second package.

4. A nestable combustible package comprising:

a hollow cone-shaped, combustible package defining an opening in the base of the package and an opening in the top of the package, wherein the opening in the base of the package is relatively larger than the opening in the top of the package;

the package having a substantially cone-shaped exterior surface and having a substantially cone-shaped interior surface parallel with said exterior surface and defining a space therebetween;

charcoal briquets filling the space between the exterior and interior surfaces of the package;

wherein the package further comprises cardboard forming the cone-shaped exterior and interior surfaces and a handle attached to the package; and wherein in a cross sectional width of the package with charcoal briquets inside, the outside width of the top of the cone is less than the width of the opening in the base of the package, permitting the package to be nested with another, identical package with the outside of the top of the cone of one package being inserted into the opening of the base of a second package.

* * * * *